United States Patent [19]

Harvey

[11] Patent Number: 4,987,431
[45] Date of Patent: Jan. 22, 1991

[54] FILM FRAME REGISTRATION AND CORRECTION BY MEANS OF FILM PRERECORDED TRACK

[75] Inventor: Donald M. Harvey, Webster, N.Y.
[73] Assignee: Eastman Kodak Company, Rochester, N.Y.
[21] Appl. No.: 457,467
[22] Filed: Dec. 27, 1989
[51] Int. Cl.⁵ .............................................. G03B 1/12
[52] U.S. Cl. .................................... 354/21; 354/173.1
[58] Field of Search ...................... 354/21, 173.1, 212
[56] References Cited

U.S. PATENT DOCUMENTS

| | | | |
|---|---|---|---|
| 2,024,627 | 12/1935 | Crabtree | 95/1.1 |
| 2,674,009 | 4/1954 | Williams | 18/59 |
| 3,186,322 | 6/1965 | Beach | 95/31 |
| 3,622,285 | 11/1971 | Yamada | 352/92 |
| 4,198,136 | 4/1980 | Staudacher et al. | 352/196 |
| 4,215,920 | 8/1980 | Butler | 352/92 |
| 4,431,292 | 2/1984 | Takahashi | 354/173.11 |
| 4,613,911 | 9/1986 | Ohta | 360/3 |
| 4,639,111 | 1/1987 | Harvey | 354/481 |
| 4,736,215 | 4/1988 | Hudspeth et al. | 354/21 |
| 4,855,769 | 8/1989 | Slavitter et al. | 354/21 |

Primary Examiner—Michael L. Gellner
Attorney, Agent, or Firm—Roger A. Fields

[57] ABSTRACT

Automatic metering and registration, between exposures, relative to an exposure station in a still camera of a next available unexposed frame of a perforationless filmstrip is achieved by reading frame number identifying cues, including stop point flags, magnetically encoded on the film. Continuation of registration is confirmed and, if necessary, corrected automatically in preparation for the next exposure by reading the same cues and comparing a stored cue for a desired next frame with a cue read from a registered unknown frame. The direction of film movement for misalignment correction is set based on the frame number comparison.

23 Claims, 3 Drawing Sheets

FILM FRAME REGISTRATION AND CORRECTION BY MEANS OF FILM PRERECORDED TRACK

The present invention relates generally to film frame metering and registration in a still film camera; and, more particularly, to automatic film frame initial registration and pre-exposure correction using film prerecorded frame specific identifying cues.

BACKGROUND OF THE INVENTION

In a still camera, the importance of achieving accurate metering and registration of each image frame with the exposure gates in the frame-to-frame advance between exposures of a film strip has long been recognized Proper frame alignment with the picture-taking optical axis not only ensures correct frame-to-frame spacing and avoidance of overlap in a series of exposed images, but also correctly positions the film frame for properly locating exposure data and the like relating to a specific frame and recorded adjacent thereto on the film at the time of exposure for later reference in producing prints from the developed negatives. Harvey U.S. Pat. No. 4,639,111, for example, discloses marginal encoding by optical means adjacent a frame at the time of exposure of frame specific field of view identification information in a tele/pan camera.

Cameras incorporating an automatic wind-up drive mechanism for the frame-to-frame film transport between supply and take-up reels have means for stopping the advance of the film at a point of registration of the next available frame with a camera exposure station in alignment with the picture-taking optical axis. A common practice of achieving accuracy of metering and registration is to utilize film resident, frame correlated marginal fiducials, such as single or multiple perforations per frame, which can be detected to determine the correct positioning for the next frame. One system uses a single perforation per frame film and a mechanical claw or pawl that detects the perforation corresponding to the next frame and disengages the wind-up motor drive when that perforation reaches a desired stopping point (see, e.g., Beach U.S. Pat. No. 3,186,322). In another system (see, e.g., Takahashi U.S. Pat. No. 4,431,292), the film travel distance is tracked by counting the number of multiple perforations per frame which pass by a given point, such as over a toothed sprocket wheel in engagement therewith.

Once registration is achieved, it is desirable to provide means to maintain such registration until commencement of the next exposure. In the absence of such provision, the film is subject to creep out of registration due to vibration or physical shock forces exerted on the camera body or residual torque forces in the drive mechanism. For cameras designed to operate with a single perforation per frame film, registration can be maintained by continuing to engage the pawl at its stopping point through the perforation and into a slot located in the camera wall or film cartridge, until the next exposure. For sprocket wheel drives, the wheels can be locked to hold the frame in registration. It is a desirable objective to be able to achieve initial frame registration, as well as pre-exposure reassurance of continuation of registration, even for films that contain no marginal perforations at all and, thus, for which such pawl and sprocket drive systems are inadequate.

It is known to provide periodic film frame correlated fiducials or cues other than perforations for various post-exposure purposes. Yamada U.S. Pat. No. 3,622,235, for example, discloses a framing adjustment device which responds to a transparent optical locator signal spaced at periodic intervals along a marginal edge of a motion picture for automatically repositioning the picture during projection. In Staudacher U.S. Pat. No. 4,198,136 a motion picture film projector responds to interrupt-transport frame markings to signal a transition between those images which are to be sequentially displayed and those which are to be displayed as still images. Butler U.S. Pat. No. 4,215,920 shows marginal frame specific fiducials in the form of optically scannable binary representations of the sequential numerical identifications of successive frames. And, Williams U.S. Pat. No. 2,674,009 shows the use of marginal magnetic cue marks in the form of microscopicly thin metal disks which can be detected by magnetic scanning heads for the purpose of instituting an event or series of events (control or variation of printing light intensity, etc.) when a predetermined point or points are reached during the course of travel of a motion picture film.

The provision of a magnetic recording track on a still camera roll film for the purpose of storing various frame specific data relating to image exposure information (such as the photographing day, exposure conditions, photographing place, photographer, data for photographic laboratory use, and the like) is disclosed in Ohta U.S. Pat. No. 4,613,911. Ohta suggests the use of such a track as a recording medium for providing the camera with information regarding film sensitivity or the number of exposed or unexposed frames. There is, however, no disclosure or suggestion of using such a magnetic track for wind-up motor control to achieve initial frame registration, or for confirming and, if necessary, correcting a previously achieved alignment in preparation for a next exposure.

SUMMARY OF THE INVENTION

The present invention provides an apparatus and a method for accomplishing the frame-to-frame film transport metering and registration procedure, suitable for use with a marginally unperforated film strip, utilizing frame specific identifying cues respectively prerecorded in correlation with the frames at periodic intervals along a film strip.

The invention also provides an apparatus and a method for automatically rechecking a previously set frame registration in order to confirm and, if necessary, correct the alignment of a desired frame with an exposure gate, prior to making the next exposure.

In one aspect of the invention, a camera having a drive means for automatically transporting a film strip, after loading in the camera and completion of a previous image frame exposure cycle, between supply and take-up positions to bring a next unexposed frame into registration with an exposure gate, includes a sensor for reading a frame specific identifying cue correlated with the next frame and located in proximity thereto, and means responsive to said sensor reading for stopping the film transport at a location in which the next frame is aligned at an exposure station with the exposure optical axis. In another aspect of the invention, means is also provided for storing the frame specific identifying cue associated with the initially registered next frame, and for reading the frame number of the frame in line with the exposure station just prior to making the next exposure and for comparing the cue of that unknown frame with the stored cue in order to confirm that the desired next exposure frame has remained in registration. Means is provided for correcting the alignment of the desired next frame to bring it back into registration, if it has been displaced.

A preferred embodiment of the invention, discussed in greater detail below, utilizes a magnetic read head to read frame specific identifying cues respectively correlated with each frame and spaced at frame length intervals along the film which take the form of binary representations of successive frame numbers magnetically prerecorded on a magnetic strip running lengthwise along one edge of the film. Film metering and registration is initially controlled automatically by wind-up drive means initiated upon completion of the previous frame exposure, with the next frame alignment stopping point determined by detection of the arrival of a stopping point identifier at the read head. Circuitry including a microcomputer responds to initiation of preparation for a next exposure cycle to compare the identification number of the frame nearest the aperture station with the previously stored identification number of the desired next exposure frame to assure their identity. If they are not the same, the microcomputer activates the film transport drive to make an adjustment in frame position to correct registration prior to undertaking the next exposure.

A frame metering and registration, and subsequent preexposure registration confirmation and correction method and apparatus in accordance with the invention is particularly useful for ensuring registration for the rapid exposure and high speed transport of a succession of image frames of a roll film having no perforations.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DETAILED DESCRIPTION OF PREFERRED EMBODIMENTS

The principles of the apparatus and method of the invention are described with reference to an exemplary implementation of a film frame metering and registration system in a still film camera that cooperates with a film strip F having a plurality of image frames n−1, n, n+1, etc., and a corresponding plurality of frame specific, film resident identifying cues exp n−1, exp n, exp n+1, etc., respectively correlated with the frames, and spaced at periodic intervals along the strip.

Figure 1:
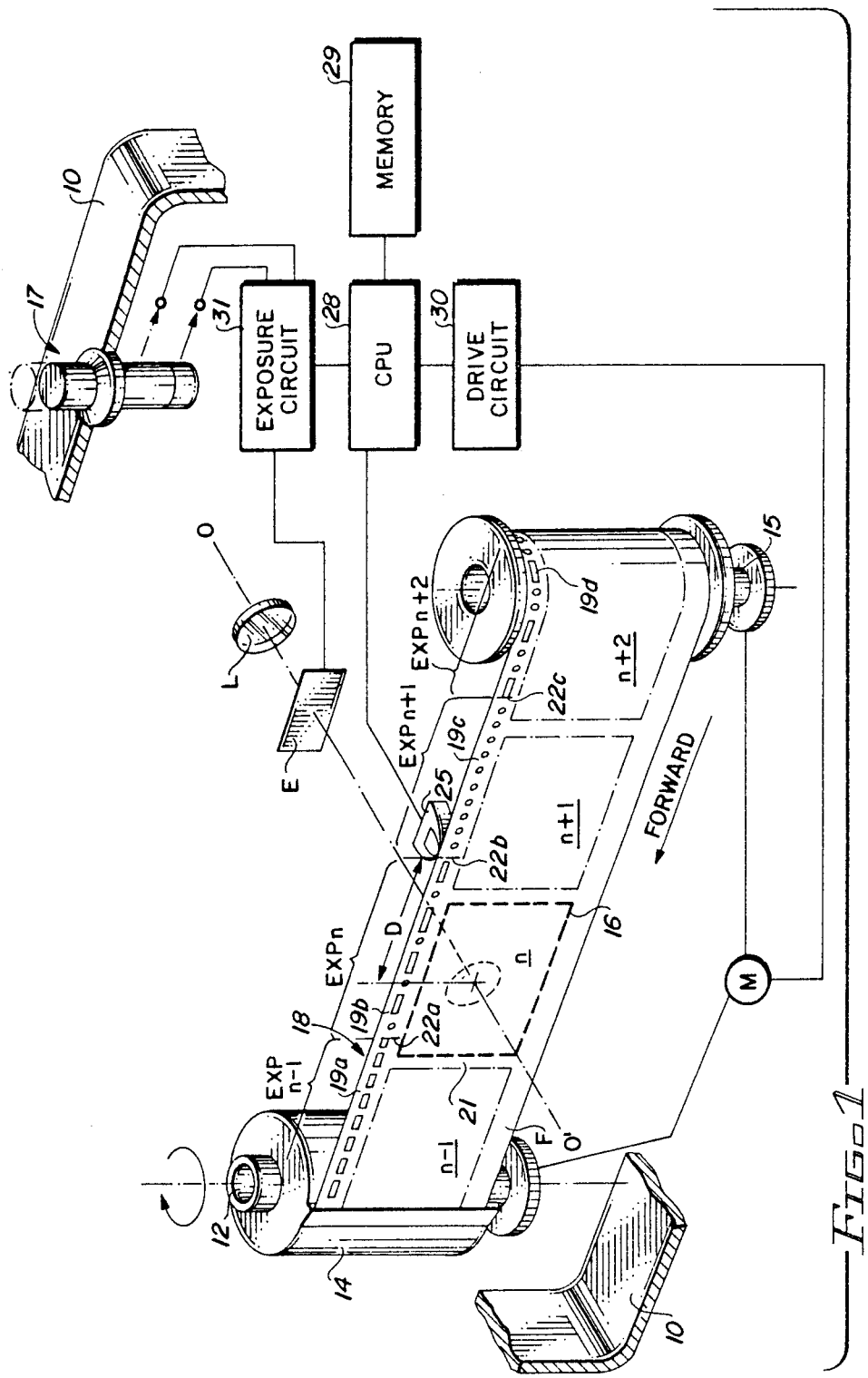
FIG. 1 is a schematic view showing the progressive movement of a film strip in frame-to-frame advancement in a still camera automatic film metering and registration system employing an apparatus and method in accordance with an embodiment of the invention.

As shown in FIG. 1, the film F is loaded in a lightproof body 10 of a still camera for movement between a supply reel 12 located in a film cartridge 14 and a take-up reel 15 spaced laterally therefrom across an exposure station or window 16, shown in dashed lines.

The station 16 is located in alignment with an optical axis O—O' so that when a frame n of the film F is positioned in registration with the station 16 it can be exposed by light passing from a subject to be photographed through a lens L when the exposure gate E is actuated, such as in response to full depression of a shutter release button 17. After exposure of the frame n, it is desired to move the loaded film F between the reels 12 and 15 for a distance corresponding to one frame interval to bring a next available unexposed frame n+1 into registration with the exposure station 16, and so forth, for a series of successive film exposures. Unlike conventional film transport mechanisms which control frame-to-frame film transport using perforation frame determining fiducials, however, the film frame metering and registration apparatus of the shown embodiment avoids the use of sprocket wheels and pawls, and acts in other ways to effect the advance of film F which does not have the usual marginal perforations.

The unperforated film F has a magnetic recording layer or strip 18 applied to at least one edge surface thereof in the longitudinal direction of the film F. The strip 18 is prerecorded at frame length intervals 19 along film F with magnetically encoded data in binary form corresponding to the sequential frame numbers exp n−1, exp n, exp n+1 of the respectively adjacent successive image frames n−1, n, n+1, etc. It is preferable that the prerecorded cue data be in a usual identifiable numerical sequence such as 1, 2, 3, 4, etc. However, it is enough that the frame identifying data be sufficiently frame specific so that a particular frame in a given plurality of frames can be separately identified from adjacent frames in the same plurality.

For the example shown in FIG. 1, image frame n−1 is identified by a marginal recording exp n−1 (shown as a series of dashes) recorded along a length interval 19a of the film F corresponding to the length of frame n−1, plus an associated desired marginal spacing increment 21. A neighboring strip portion 19b to the right of portion 19a has data exp n recorded thereon (shown as a series of alternating dots and dashes) for a frame length correlated with the frame n shown located in registration with the exposure station 16. To the right of the data exp n for the frame n is located data exp n+1 (shown as a series of dots) prerecorded in a frame length 19c correlated with the frame n+1. This scheme is continued at a frame length interval 19d for frame n+2, and so on for successive frames in a given plurality of frames, preferably for the entire length of exposable film, each cue location being recorded with a cue that is specific to identify and distinguish a particular frame in the plurality. Frame registration film transport stop point identifiers or flags 22 can be either separately recorded or incorporated within the code format of the precoded frame numbers themselves in accordance with known computer related magnetic media drive technology.

For the shown embodiment, a cue sensor in the form of a magnetic read head 25 is positioned within the camera body 10 at a location to be in a data reading position adjacent the magnetic strip 18 when the roll film F is loaded. The read position of the head 25 is laterally offset from the optical axis O—O', and thus the center of the frame exposure station 16, by a distance D as seen in FIG. 1. Accordingly, the respective frame registration stop points 22 and frame specific cue prerecording portions 19 are likewise displaced the same distance with respect to the frames n−1, n, n+1, etc., so that the flag 22 for a particular frame will be located at the sensor read head 25 when that frame is in its position of correct registration with the exposure station 16. FIG. 1 shows frame n in proper registration for exposure at the station 16 when the flag 22b at the trailing edge of portion 19b of magnetic strip 18 is disposed adjacent the head 25.

Circuitry, including a microcomputer 28 and a memory 29, is electrically interfaced with the sensor 25 and with a film transport drive assembly which comprises a bidirectional drive motor M. The motor M is connected for control by a drive circuit 30 and is mechanically coupled to drive the reels 12 and/or 15 to advance the film F from an exposed frame n in the forward direction toward a next unexposed frame n+1 (direction of arrow) in response to an exposure completion signal received by the microcomputer 28 from an exposure circuit 31, or retract the film F, if necessary, in the opposite (backward) direction from frame n toward frame n−1.

Transport in the frame-to-frame advance of the film strip F between exposures is effected by activating the motor M under control of the microcomputer 28 to drive the spool of the one of the reels 12, 15 in rotation about its axis which will wind the strip F around the circumference of its associated spool spindle to move the film in the desired direction. The other spool may be left freewheeling to rotate about its axis in response to drawing of the film therefrom. For the arrangement shown, frame-to-frame advance occurs by driving the cartridge reel 12 to wind the film F to the left by successive single frame length intervals back into the cartridge 14, with the film being retrieved into the cartridge directly after exposure. It is to be understood, however, that the same principles apply in systems wherein frame-to-frame advance occurs in a direction from the supply reel 12 onto the take-up reel 15, such as by driving the take-up reel 15 and letting the supply reel 12 rotate freely.

Frame advance is initiated after completion of exposure of a frame n by receipt of a signal from the exposure circuit 31 indicating the end of actuation of the shutter mechanism of exposure gate E. The motor M will normally be operated to drive the film F in a direction (i.e. forward direction) to bring the next available unexposed frame n+1 toward the exposure station 16. The stopping point of the film F will occur when the sensor 25 detects the stopping point flag 22c (shown as the trailing edge of the strip portion 19c) which is correlated with the number identification cue exp n+1 for the frame n+1. This will place frame n+1 in the position shown now occupied by the frame n in FIG. 1, and ensure its registration with the exposure station 16. By dispensing with mechanical interaction of pawls and sprocket wheels with the film margins, a smooth and rapid frame-to-frame film advance is achievable. It will of course be appreciated, that other flags may be placed ahead of the stopping point flag 22 or other provision made to slow the film transport speed prior to reaching the stopping point.

In accordance with a feature of the invention, means are provided for automatically confirming and, if necessary, correcting the previously achieved alignment of a frame n of the film strip F relative to the exposure station 16 to ensure that registration has been maintained during any delay that occurs between the time of initial registration and the time that the exposure gate E is actuated to expose that frame.

Figure 2:
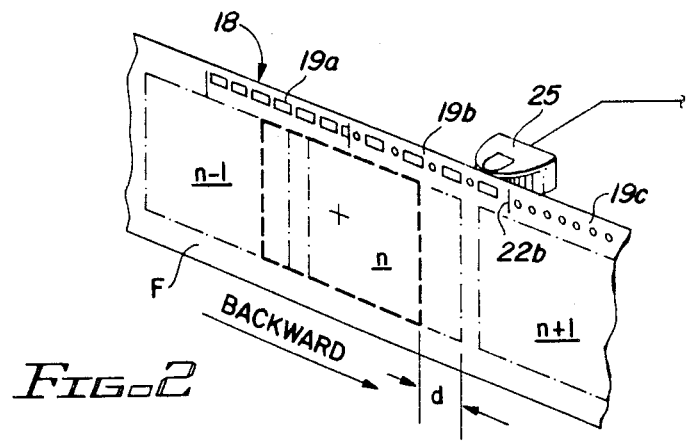
FIGS. 2-4 are schematic fragmentary views showing steps in the performance of the method of the invention in accordance with the apparatus shown in FIG. 1.

FIG. 2 indicates a position of the frame n of a film F following a delay in which a vibration or shock to the camera body 10 has caused the film F to creep by a distance d in the backward direction, thereby taking the frame n out of registration with the shutter station 16 before exposure. As shown in FIG. 2, film movement relative to the camera exposure station 16 has resulted in the prerecorded data portion 19b being correspondingly shifted so that the registration stop point flag 22b is no longer aligned with the sensor 25.

Figure 3:
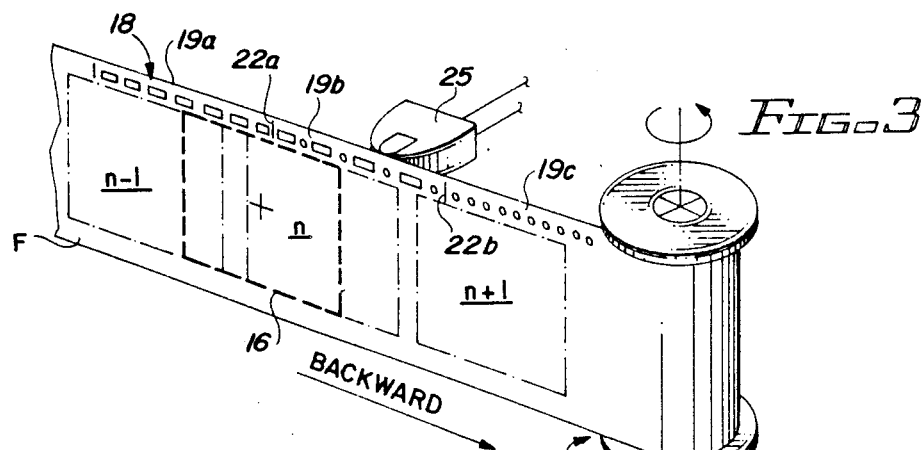

In accordance with the invention, upon initiation of a next exposure cycle, during preexposure setting of camera parameters, pretravel of release, ranging, lens cover opening, etc., sensor 25 acts under control of the microcomputer 28 to detect any shift in the stop point 22b. The microcomputer 28 responds to a detected shift by actuating the motor M to wind the film F in which direction is necessary to bring the desired cue 22b back to its previously established registration position in front of the read head 25. When no frame is in registration during the confirmation process, the microcomputer 28 controls the drive circuit 30 as indicated in FIG. 3 to retract the film F in the backward direction to bring an unknown frame (in this case frame n−1) into registration with the station 16 and the associated frame number cue (in this case exp n−1) is read by the sensor. The shown embodiment looks for registration of the next left frame; however, it is understood that seeking to the right may also be done.

Figure 4:
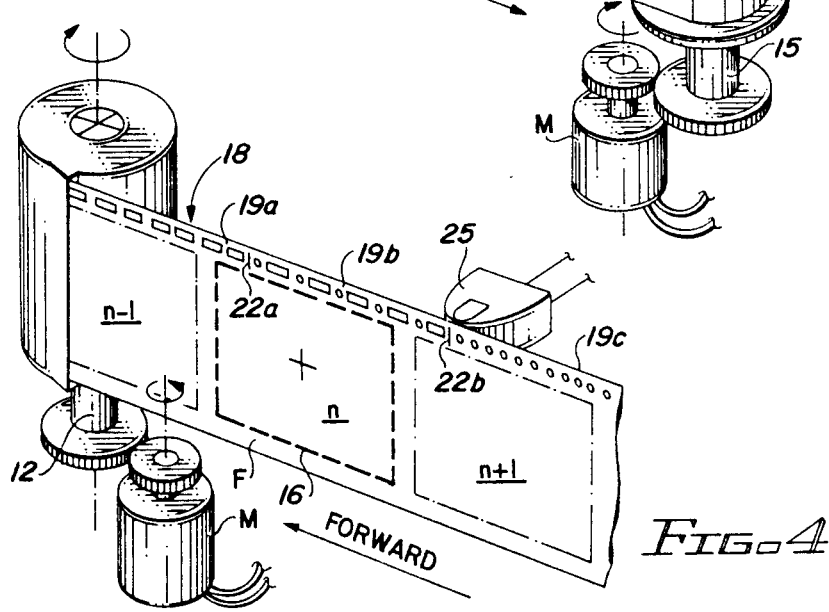

A comparison is then conducted between the unknown frame cue (i.e., exp n−1 and the desired frame cue (i.e., exp n) previously stored in memory 29 (FIG. 1) at the time of initial registration of the frame n. If the two coincide, correct registration of the desired frame is confirmed and the exposure gate E is enabled to complete the exposure cycle. If the two do not coincide, the motor M is activated, as indicated in FIG. 4, to drive the film F in the direction necessary, as determined by the comparison, until the stop point cue 22b is adjacent the head 25, at which time the exposure gate E is then reenabled.

Figure 5:
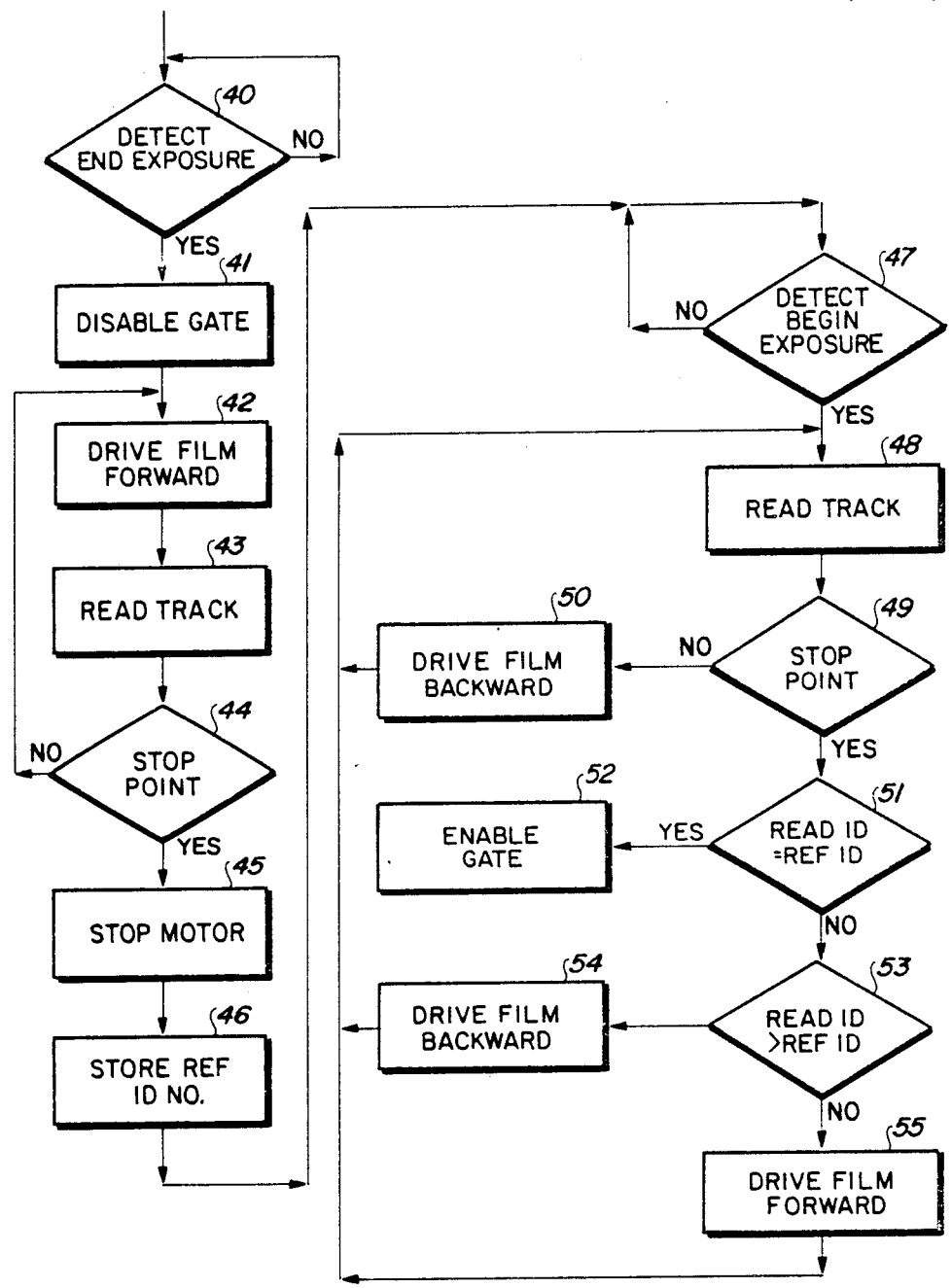
FIG. 5 is a flow diagram of the steps of a program usable in implementing the embodiment of FIGS. 1-4.

The logic to accomplish the registration and automatic confirmation and correction processes may be implemented in a software or hardware embedded program in accordance with the flow chart rendition thereof shown in FIG. 5. As shown by blocks 40, 41, 42, upon detection of a signal indicating completion of an exposure cycle by the circuit 30, the exposure gate E is disabled and the microcomputer 28 signals the drive circuit 30 to actuate the motor M in the forward direction to advance the next available unexposed frame toward the exposure station 16. As the film F advances, read head 25 reads the next frame number cue from the track 18 (block 43) and the process continues until the stop point 22 for that frame reaches the read head 25 (block 44). The motor M is then stopped (block 45) with the next frame in proper registration with the exposure station 16, and the frame number read from track 18 is stored for later reference in the memory 29 (block 46).

When the next exposure cycle is to be initiated and preexposure is signalled (block 47), such as when button 17 is partially depressed to the dot-dash position indicated in FIG. 1, track 18 is again read by sensor 25 (block 48) in a sequence of steps to confirm that the frame whose frame number was stored in memory 29 as a reference is still in registration with the station 16. If no stop point 22 is located at the sensor head 25, the film F is driven in a given direction (backward in the shown embodiment) until an unknown frame stop point cue is adjacent the head 25 (blocks 49,50) and, thus, an unknown frame is in registration with the exposure station 16. The read identification number of the unknown frame is then compared with the stored reference number of the desired next frame and, if the same are equal, identity of the unknown frame with the desired frame is confirmed and the gate is enabled for completion of the exposure (blocks 51, 52). If identity does not exist, the film F is driven to a next stopping point where the comparison is repeated until the correct registration of the desired next frame has been restored. The direction in which to drive the film F is determined based on whether the compared unknown frame number is lower or higher than the stored reference frame number (blocks 53, 54, 55).

A film frame metering and registration system in accordance with the foregoing description provides a mechanism readily adaptable for the smooth high speed frame-to-frame advance between exposures in a still camera useful to achieve a rapid succession of sequential exposures, such as needed in sport photography or the like. As already indicated, the prerecordings in the frame correlated positions 19 can be formatted to give cues in addition to stopping points 22 as, for example, to give cues to one or more reductions in film transport speed from an initial high speed prior to searching the stopping point.

Those skilled in the art to which the invention relates will understand that the foregoing detailed description is intended to be merely exemplary and not exclusive, and that various substitutions and modifications may be made to the described embodiment without departing from the spirit and the scope of the invention as defined by the claims below. It is noted, for example, that the reference to a bidirectional motor M, above, is intended to include a single motor M which may be rotated in forward or reverse directions, two separate motors each rotatable in its own opposite direction, or a motor which cooperates with gearing, clutching or other mechanism to provide film drive in either the forward or backward direction as selected.

What is claimed is:

1. Apparatus for automatically metering and registering a frame of a film strip relative to an exposure station between actuations of an exposure gate in a camera, the film strip having a plurality of image frames and further having a plurality of magnetically encoded frame identifying cues including registration stopping point flags respectively correlated with said specific frames and spaced at periodic intervals along said strip, said apparatus comprising:
   bidirectional drive means in said camera responsive to operation of said exposure gate for automatically transporting said film strip in a direction to advance a second frame toward said exposure station, after said film is loaded in said camera and a first frame thereof is exposed;
   a magnetic read head for reading the frame specific identifying cue and stopping point flag correlated with said second frame and for stopping the transport of said film in said direction in response thereto at a point in which the film has advanced by a distance to bring said second frame into registration with said exposure station.

2. Apparatus as in claim 1, including means for automatically confirming and, if necessary, correcting the registration of said second frame relative to said exposure station in preparation for a next actuation of said exposure gate, wherein said means for reading the frame specific identifying cue further comprises means for reading a frame specific identifying cue correlated with an unknown frame located in registration with said station prior to the next exposure; and said apparatus further comprises means for storing of said read second frame cue as a reference frame cue to indicate desired registration of said second frame with said exposure station for said next exposure; means for comparing said read unknown frame cue with said stored reference frame cue; and means responsive to said comparison for activating said drive means to move said second frame into registration with said station prior to said next actuation of said exposure gate if said comparison determines that said unknown frame and said second frame are not the same.

3. Apparatus as in claim 2 for metering and registering a film strip having frame specific identifying cues in the form of magnetically encoded binary representations of successive frame numbers, wherein said comparing means includes means for determining the location of said second frame relative to said unknown frame where they are not the same, and said activating means responsive to said comparison includes means for activating said drive means to move said film in a direction set in response to said determined location.

4. A method for automatically metering and registering a frame of a film strip relative to an exposure station between actuations of an exposure gate in a camera, the film strip having a plurality of image frames and further having a plurality of magnetically encoded frame specific identifying cues including registration stopping point flags respectively correlated with said frames and spaced at periodic intervals along said strip, said method comprising the steps of:
   automatically transporting said film strip in a direction to advance a second frame toward said exposure station, after said film is loaded in said camera and a first frame thereof is exposed;
   reading the frame specific identifying cue and stopping point flag correlated with said second frame using magnetic reading head means; and
   in response to said reading of said stopping point flag in said reading step automatically stopping the transport of said film in said direction at a point in which the film has advanced by a distance to bring said second frame into registration with said exposure station.

5. A method as in claim 4, further including the step of automatically confirming and, if necessary, correcting the registration of a said second frame relative to said exposure station in preparation for a next actuation of said exposure gate.

6. A method as in claim 5, further comprising the step of storing said read second frame cue as a reference frame cue to indicate desired registration of said second frame with said exposure station for said next exposure; and
   wherein said confirming and correcting step comprises the steps of reading the frame specific identifying cue correlated with an unknown frame located in registration with said station prior to the next exposure; comparing said read unknown frame cue with said stored reference frame cue; and automatically activating camera drive means to move said second frame into registration with said station prior to said next actuation of said exposure gate if said comparison determines that said unknown frame and said second frame are not the same.

7. A method as in claim 6 for metering and registering a film strip having frame specific identifying cues in the form of magnetically encoded binary representations of successive frame numbers, wherein said comparing step includes the step of determining the location of said second frame relative to said unknown frame where they are not the same, and said activating step comprises activating said drive means to move said film in a direction set in response to said determined location.

8. Apparatus for automatically confirming and correcting the registration of a frame of a film strip previously established relative to an exposure station between successive actuations of an exposure gate in a camera, the film strip having a plurality of image frames and a plurality of frame specific identifying cues respectively correlated with said frames and spaced at periodic intervals along said strip, said apparatus comprising:
 bidirectional drive means in said camera responsive to operation of said exposure gate for automatically transporting said film strip, after said film is loaded in said camera and a first frame thereof is exposed, by a distance to bring a second frame into registration with said station;
 means for reading the frame specific identifying cue correlated with said second frame and for storing the same as a reference frame cue to indicate desired registration of said second frame with said exposure station for a next exposure;
 means for reading the frame specific identifying cue correlated with an unknown frame located in registration with said station prior to said next exposure and for comparing said read unknown frame cue with said stored reference frame cue; and
 means responsive to said comparison for activating said drive means to move said second frame into registration with said station prior to said next exposure if said comparison determines that said unknown frame cue and said second frame cue are not the same.

9. Apparatus as in claim 8, further comprising means for controlling said drive means in response to said means for reading said second frame cue to ensure proper initial registration of said second frame with said exposure station.

10. Apparatus as in claim 8, wherein said means for reading said unknown frame cue comprises means, responsive to preparation for said next exposure and prior to a next actuation of said exposure gate, for reading said unknown frame cue.

11. Apparatus as in claim 10, further comprising means responsive to said preparation for controlling said drive means to bring said unknown frame into registration with said station, if no frame is in registration with said station.

12. Apparatus as in claim 8 for confirming and correcting the alignment of a film strip having frame specific identifying cues in the form of magnetically encoded frame number identifying data, wherein said means for reading said second frame cue and said means for reading said unknown frame cue comprise common means including a sensor having a magnetic read head.

13. Apparatus as in claim 12, wherein said common means further comprises a microcomputer operatively connected to said head and to said drive means.

14. Apparatus as in claim 13, wherein said means for storing said reference frame cue comprises a memory operatively associated with said microcomputer.

15. A method for automatically confirming and correcting the registration of a frame of a film strip previously established relative to an exposure station in a camera, the film strip having a plurality of image frames and a plurality of frame specific identifying cues respectively correlated with said frames and spaced at periodic intervals along said strip, said method comprising the steps of:
 automatically transporting said film strip, after it is loaded in said camera and a first frame thereof is exposed, by a distance to bring a second frame into registration with said station;
 reading the frame specific identifying cue correlated with said second frame, and storing the same as a reference frame cue to indicate desired registration of said second frame with said exposure station for a next exposure;
 reading the frame specific identifying cue correlated with an unknown frame located in registration with said station prior to said next exposure, and comparing said read unknown frame cue with said stored reference frame cue; and
 activating camera drive means to move said second frame into registration with said station prior to said next exposure if said comparison determines that said unknown frame cue and said reference frame cue are not the same.

16. A method as in claim 15, further comprising the step of ensuring correct initial registration of said second frame with said exposure station in response to reading said second frame specific identifying cue.

17. A method as in claim 15, wherein said unknown frame cue reading step comprises reading said unknown frame cue in response to preparation for said next exposure and prior to a next actuation of said exposure gate.

18. A method as in claim 17, further comprising the step of automatically bringing said unknown frame into registration with said station in response to said preparation if no frame is in registration with said station.

19. A method as in claim 18, for confirming and correcting the alignment of a film strip having frame specific identifying cues in the form of magnetically encoded frame number identifying data, wherein the frame specific identifying cue reading steps respectively comprise steps of reading the magnetically encoded data on said strip.

20. Apparatus for automatically correcting registry misalignment relative to an exposure station in a camera of a next available frame of a film strip between successive actuations of an exposure gate, the film strip having a plurality of frame number identification and registry alignment cues respectively spaced at periodic intervals along said film in correlation with each of a plurality of image frames, said apparatus comprising:
 bidirectional drive means;
 means for controlling said bidirectional drive means responsive to the operation of said exposure gate for automatically transporting said film strip, after said strip is loaded in said camera and a frame thereof is exposed, by a distance in a direction to advance a next available frame to a position of registration with said exposure station;
 means for reading the frame number identification and registry alignment cue of said next frame and for stopping the advance of said strip in response thereto, when said next frame is in a position of registration with said station;

means for storing said read next frame cue to indicate desired registration of said next frame with said exposure station at a next actuation of said exposure gate;

means for controlling said bidirectional drive means, in response to preparation for a next frame exposure and prior to said next actuation of said gate, to bring an unknown frame into registration with said station if no frame is in registration with said station;

means for controlling said reading means to read the frame number cue correlated with said unknown frame brought into registration with said station;

means for comparing said unknown frame number cue with said stored next frame cue; and means responsive to said comparing means for controlling said drive means to move said strip in a direction to bring said desired next frame into registration with said station prior to said next exposure, if said comparison determines that said unknown frame cue and said next frame cue are not the same.

21. Apparatus as in claim 20 for correcting registry misalignment with a film strip having cues in the form of magnetically encoded data, wherein said reading means comprises a magnetic read head and said means for controlling said drive means comprises a microcomputer operatively connected to said read head and said drive means.

22. A method for automatically correcting registry misalignment relative to an exposure station in a camera of a next available frame of a film strip between successive actuations of an exposure gate, the film strip having a plurality of frame number identification and registry alignment cues respectively spaced at periodic intervals along said film in correlation with each of a plurality of image frames, said method comprising the steps of:

responsive to the operation of said exposure gate, automatically transporting said film strip, after said strip is loaded in said camera and a frame thereof is exposed, by a distance in a direction to advance a next available frame to a position of registration with said exposure station;

reading the frame number identification and registry alignment cue of said next frame and stopping the advance of said strip in response thereto when said next frame is in a position of registration with said station;

storing said read next frame cue to indicate desired registration of said next frame with said exposure station at a next actuation of said exposure gate;

in response to preparation for a next frame exposure and prior to said next actuation of said gate, bringing an unknown frame into registration with said station if no frame is in registration with said station;

reading the frame number cue correlated with said unknown frame brought into registration with said station;

comparing said unknown frame number cue with said stored next frame cue; and moving said strip in a direction to bring said next frame into registration with said station prior to said next exposure, if said comparison determines that said unknown frame cue and said next frame cue are not the same.

23. A method as in claim 22 for correcting registry misalignment with a film strip having cues in the form of magnetically encoded data, wherein said reading steps comprise reading said cues by means of magnetic read head.

* * * * *